United States Patent
Kim

(10) Patent No.: US 11,941,316 B2
(45) Date of Patent: Mar. 26, 2024

(54) VEHICLE INFORMATION DISPLAY APPARATUS AND METHOD

(71) Applicant: HYUNDAI MOBIS CO., LTD., Seoul (KR)

(72) Inventor: Tae Hun Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/507,488

(22) Filed: Oct. 21, 2021

(65) Prior Publication Data

US 2022/0121412 A1    Apr. 21, 2022

(30) Foreign Application Priority Data

Oct. 21, 2020 (KR) .................. 10-2020-0136789

(51) Int. Cl.
  *G06F 3/14*   (2006.01)
  *B60K 35/00*  (2006.01)

(52) U.S. Cl.
  CPC ............ *G06F 3/1423* (2013.01); *B60K 35/00* (2013.01); *B60K 2370/152* (2019.05); *B60K 2370/166* (2019.05)

(58) Field of Classification Search
  None
  See application file for complete search history.

(56) References Cited

U.S. PATENT DOCUMENTS

| | | | | |
|---|---|---|---|---|
| 2008/0211652 | A1* | 9/2008 | Cope | B60K 35/00 340/461 |
| 2011/0187547 | A1* | 8/2011 | Kweon | G01C 21/3697 340/670 |
| 2014/0220948 | A1* | 8/2014 | Xia | H04W 4/48 455/415 |
| 2016/0363991 | A1* | 12/2016 | Schlecht | G09F 27/005 |

OTHER PUBLICATIONS

Carplay, https://web.archive.org/web/20200331202141/https://www.apple.com/my/ios/carplay/ Mar. 31, 2020 (Year: 2020).*
Apple CarPlay: making a Call https://www.youtube.com/watch?v=FSe2AOrNHMA Apr. 29, 2019 (Year: 2019).*

* cited by examiner

*Primary Examiner* — Matthew Yeung
(74) *Attorney, Agent, or Firm* — Novo TechIP International PLLC

(57) ABSTRACT

A vehicle information display apparatus may include: an input unit configured to receive pre-setting information from a user terminal; a memory configured to store a program for controlling an interior display in consideration of the pre-setting information, as a vehicle starts driving; and a processor configured to execute the program, wherein the processor controls the interior display divided into pre-set areas in consideration of the pre-setting information, such that a screen is displayed on each of the areas.

5 Claims, 18 Drawing Sheets

VEHICLE INFORMATION DISPLAY APPARATUS AND METHOD

CROSS-REFERENCE TO RELATED APPLICATIONS

This application claims priority to and the benefit of Korean Patent Application No. 10-2020-0136789, filed on Oct. 21, 2020, the disclosure of which is incorporated herein by reference in its entirety.

BACKGROUND OF THE INVENTION

1. Field of the Invention

The present disclosure relates to a vehicle information display apparatus and method.

2. Discussion of Related Art

According to the related art, the size of a display in a vehicle has been gradually increased with the improvement in shape of the vehicle. Furthermore, a technology of utilizing the entire area across a display, windshield and window as a display has been developed.

Depending on a driving environment or a user's needs, various pieces of traveling information or infotainment information need to be properly displayed. However, the related art has a limitation in that it displays only limited information.

BRIEF SUMMARY OF THE INVENTION

Various embodiments are directed to a vehicle information display apparatus and method which can display vehicle information according to a driving condition and a user's needs.

In an embodiment, a vehicle information display apparatus may include: an input unit configured to receive pre-setting information from a user terminal; a memory configured to store a program for controlling an interior display in consideration of the pre-setting information, as a vehicle starts driving; and a processor configured to execute the program, wherein the processor controls the interior display divided into a plurality of screens or pre-set areas based on of the pre-setting information, such that a different image is displayed on each of the screen.

The input unit may receive user profile information as the pre-setting information, and the processor may control an exterior display of the vehicle to display a welcome message using the user profile information, before a user gets on the vehicle, or control an interior display to display the welcome message.

The input unit may receive navigation setting information as the pre-setting information, and the processor may control the interior display to display route guide information based on the navigation setting information, as the vehicle starts driving.

The input unit may receive reserved call or message information as the pre-setting information, and the processor may send a call or message as the vehicle starts driving.

When sending the call, the processor may recommend a calling time in consideration of driving condition information.

The processor may display screens for the respective areas in consideration of the pre-setting information and execute reserved functions, wherein the reserved functions are sequentially executed in consideration of a pre-set priority.

When media playing information and calling information are included in the pre-setting information, the processor may control media playing according to the media playing information, after a call is ended.

The input unit may receive external communication text information as the pre-setting information, and the processor control the exterior display to display the external communication text information in consideration of a driving condition.

In another embodiment, a vehicle information display method may include the steps: (a) receiving pre-setting information; and (b) performing screen display control on an interior display by using the pre-setting information.

The step (b) may include controlling the interior display divided into a plurality of pre-set areas or screens, such that a different image is displayed for each screen or pre-set area.

When user profile information is received in the step (a), the step (b) may include controlling an exterior or interior display of the vehicle to display a welcome message using the user profile information.

When navigation setting information is received in the step (a), the step (b) may include displaying driving route guide information on the interior display.

When reserved call or message information is received in the step (a), the step (b) may include sending a call or message as the vehicle starts driving.

When the pre-setting information for executing a plurality of functions is received in the step (a), the step (b) may include executing the functions in consideration of a function execution order based on a preset priority.

When external communication text information is received in the step (a), the step (b) may include extracting the external communication text information and displaying the extracted external communication text information through an exterior display in consideration of a driving condition.

In accordance with the embodiments of the present disclosure, the vehicle information display apparatus and method may perform the pre-setting process on the interior display of a vehicle through a mobile phone app interworking with a vehicle device, display the driving safety pop-up screen on the interior display, set/remove a focus on/from an interior display screen, control the interior display screen according to the voice recognition or independent mode setting, or control the mobile phone screen for each driving speed, thereby increasing the user convenience.

The effects of the present disclosure are not limited to the above-mentioned effects, and other effects which are not mentioned herein will be clearly understood by those skilled in the art from the following descriptions.

DETAILED DESCRIPTION OF THE INVENTION

The advantages and characteristics of the present disclosure and a method for achieving the advantages and characteristics will be clearly described through the following embodiments with reference to the accompanying drawings.

However, the present disclosure is not limited to the following embodiments, but may be implemented in various shapes different from each other, and the following embodiments are only provided to easily deliver the purposes, configurations and effects of the present disclosure to those skilled in the art to which the present disclosure pertains. Therefore, the scope of the present disclosure is defined by claims.

Terms used in this specification are used for describing exemplary embodiments while not limiting the present invention. The terms of a singular form may include plural forms unless referred to the contrary. The meaning of 'comprise' and 'comprising' used in the specification specifies a component, step, operation, and/or element but does not exclude the presence or addition of other components, steps, operations, and/or elements.

Figure 1:
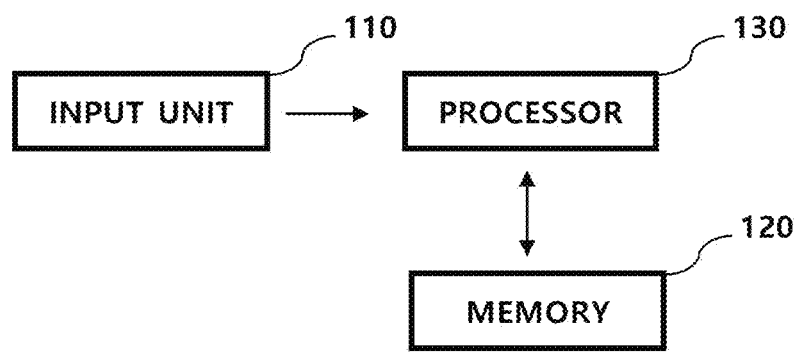
FIG. 1 is a diagram illustrating a vehicle information display apparatus in accordance with an embodiment of the present disclosure.

FIG. 1 is a diagram illustrating a vehicle information display apparatus in accordance with an embodiment of the present disclosure.

The vehicle information display apparatus in accordance with the embodiment of the present disclosure includes an input unit 110 configured to receive pre-setting information from a user terminal, a memory 120 configured to store a program for controlling an interior display by considering the pre-setting information as a vehicle starts driving, and a processor 130 configured to execute the program. The processor 130 controls the interior display divided into a plurality of pre-set areas or screens based the pre-setting information, such that the interior display displays an image for each screen or pre-set area.

The input unit 110 receives user profile information as the pre-setting information, and the processor 130 controls an exterior display of the vehicle to display a welcome message using the user profile information, before a user gets on the vehicle, or controls the interior display to display the welcome message.

The input unit 110 receives navigation setting information as the pre-setting information, and the processor 130 controls the interior display to display route guide information based on the navigation setting information, as the vehicle starts driving.

The input unit 110 receives reserved call or message information as the pre-setting information, and the processor 130 sends a reserved call or message as the vehicle starts driving.

The processor 130 recommends a sending time in consideration of driving condition information, when sending the reserved call.

The processor 130 displays the screens for the respective areas in consideration of the pre-setting information, and executes reserved functions. At this time, the processor 130 sequentially executes the reserved functions in consideration of a preset priority.

When media playing information and call sending information are included in the pre-setting information, the processor 130 controls media playing according to the media play information, after a call is ended.

The input unit 110 receives external communication text information as the pre-setting information, and the processor 130 controls the exterior display to display an external communication text in consideration of a driving condition.

A vehicle information display method in accordance with an embodiment of the present disclosure includes step (a) of receiving pre-setting information and step (b) of performing screen display control on an interior display by using the pre-setting information.

Step (b) includes performing screen display control on an interior display divided into a plurality of pre-set areas or screens, such that the screen display is controlled for each of the pre-set areas or screens.

When user profile information is received in step (a), step (b) includes controlling an exterior or interior display of a vehicle to display a welcome message by using the user profile information.

When navigation setting information is received in step (a), step (b) includes displaying driving route guide information on the interior display.

When reserved call or message information is received in step (a), step (b) includes sending a reserved call or message as the vehicle starts driving.

When the pre-setting information for executing a plurality of functions is received in step (a), step (b) includes executing the functions in consideration of a function execution order based on a pre-set priority.

When external communication text information is received in step (a), step (b) includes extracting the external communication text information and displaying the extracted external communication text information through the exterior display in consideration of a driving condition.

FIGS. 2 to 18 illustrate a pre-setting process and UIs (User Interfaces) accompanied by the process, in accordance with the embodiment of the present disclosure.

Figure 2:
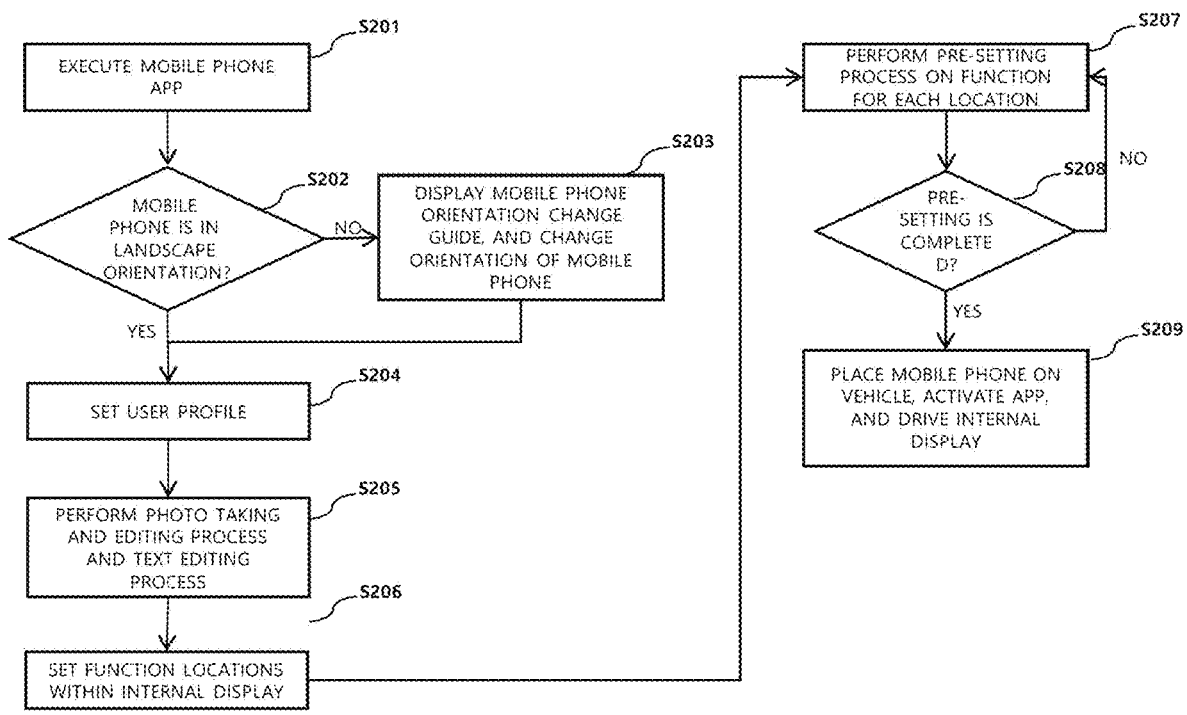
FIGS. 2 to 18 illustrate a pre-setting process and UIs (User Interfaces) accompanied by the process, in accordance with the embodiment of the present disclosure.

Referring to FIG. 2, a user executes a mobile phone app in step S201, and checks whether the mobile phone is in the landscape orientation, in step S202.

When it is checked in step S202 that the mobile phone is not in the landscape orientation, a mobile phone orientation change guide is displayed, and the user checks whether the orientation of the mobile phone has been changed, in step S203.

When it is checked in step S202 that the mobile phone is in the landscape orientation or it is checked in step S203 that the orientation of the mobile phone has been changed, a user profile setting process is performed in step S204.

Then, a photo taking and editing process and a text editing process are performed in step S205, and the locations of functions within an interior display are set in step S206.

Then, a pre-setting process is performed on the function for each location in step S207.

In step S208, the user checks whether the pre-setting process is completed. When it is checked in step S208 that the pre-setting is completed, the user places a mobile phone on the vehicle, activates an app, and drives the interior display, in step S209.

Figure 3:
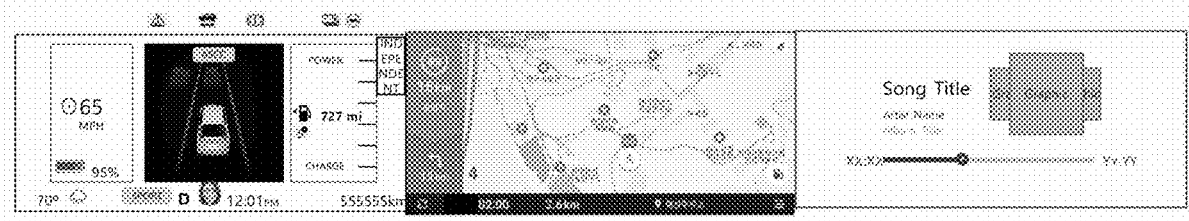

Referring to FIG. 3, the interior display is divided into a preset number of areas or screen, e.g. three areas or screen. Specifically, a cluster screen (area A1), a navigation screen (area A2) and a media screen (area A3) are displayed.

A cluster theme and ADAS information are displayed on the cluster screen, and a destination, driving route, time information and the like are displayed on the navigation screen.

In relation to cluster, a function related to an operation of changing a theme and central screen is set through a mobile phone app. When the user gets on the vehicle, the theme and the central screen are displayed according to the set function.

In relation to navigation, a destination and route are selected through the mobile phone app. When the user gets on the vehicle and presses a start button, route driving guidance is started.

In relation to media, a music/video function is selected through the mobile phone app. When the user gets on the vehicle, the corresponding function is started to play music/video.

In relation to call, the user selects a contact through the mobile phone app, sets a call reservation function, inputs a message after selecting the contact, and sets a message sending reservation function. Then, when the user gets on the vehicle, places the mobile phone and turns on the ignition, a calling pop-up screen is displayed, and a reserved message (e.g. I'm leaving now) is transmitted to the selected contact.

In relation to A/C (Air Conditioning), a function related to AC/seat is pre-set through the mobile phone app. When the user gets on the vehicle, the function related to AC/seat is displayed according to a pre-set value.

In relation to settings, a communication text is set through the mobile phone app. When the user gets on the vehicle, the pre-set communication text is displayed through the exterior display.

Figure 4:
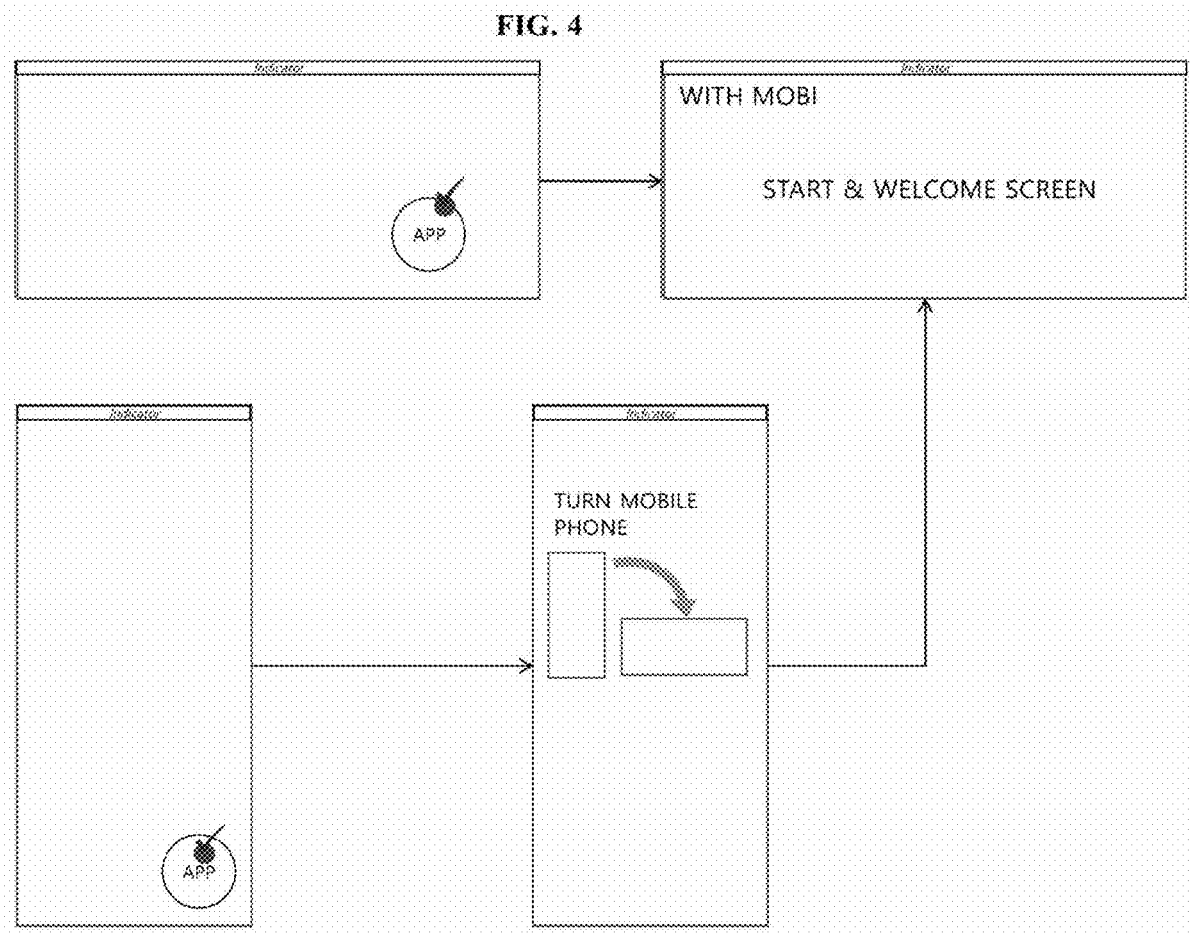

Referring to FIG. 4, profile registration and function allocation/setting for each display area are performed through a mobile phone app. When a user places the mobile phone after getting on the vehicle, functions set on the mobile phone are displayed on the interior display.

As the user's hand approaches the mobile phone, a guide message to instruct the user to turn the mobile phone is displayed in case that the mobile phone is in a vertical viewing mode. When the mobile phone is completely turned to a horizontal viewing mode, a start and welcome screen is displayed.

Figure 5:
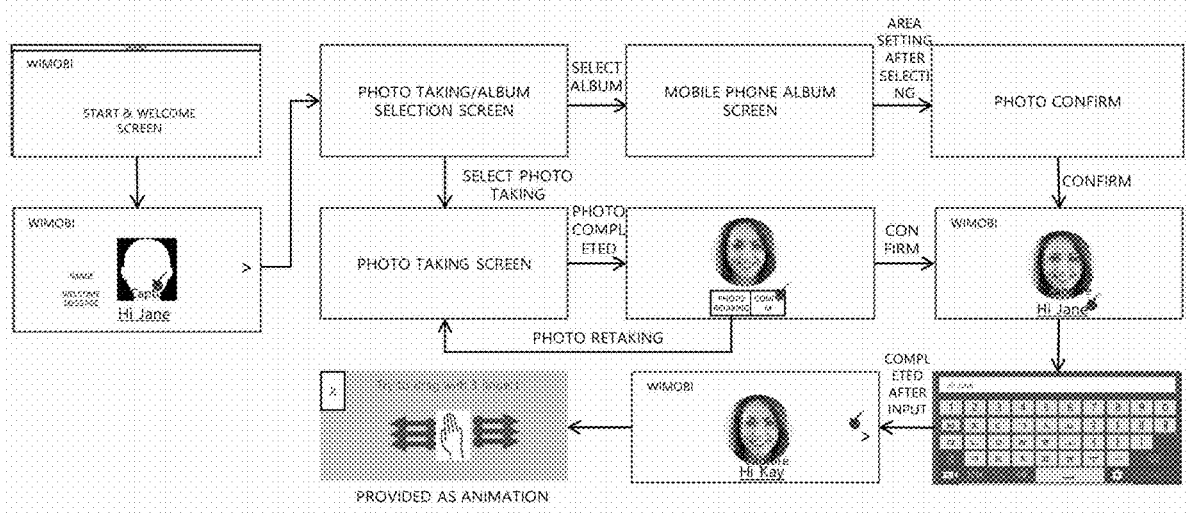

FIG. 5 illustrates a profile registration process using a mobile phone app.

The start and welcome screen is changed to an image and welcome message setting screen, such that an image is decided through an album selection step, an image selection step through a mobile phone album, an area setting step and a photo confirmation step, or decided through an image capturing step through a camera and a photo confirmation step.

On the welcome message setting screen, an input screen including a keyboard is displayed. When a message (e.g. Hi, Jane) is completely inputted, the decided image and the welcome message are displayed together.

Figure 6:
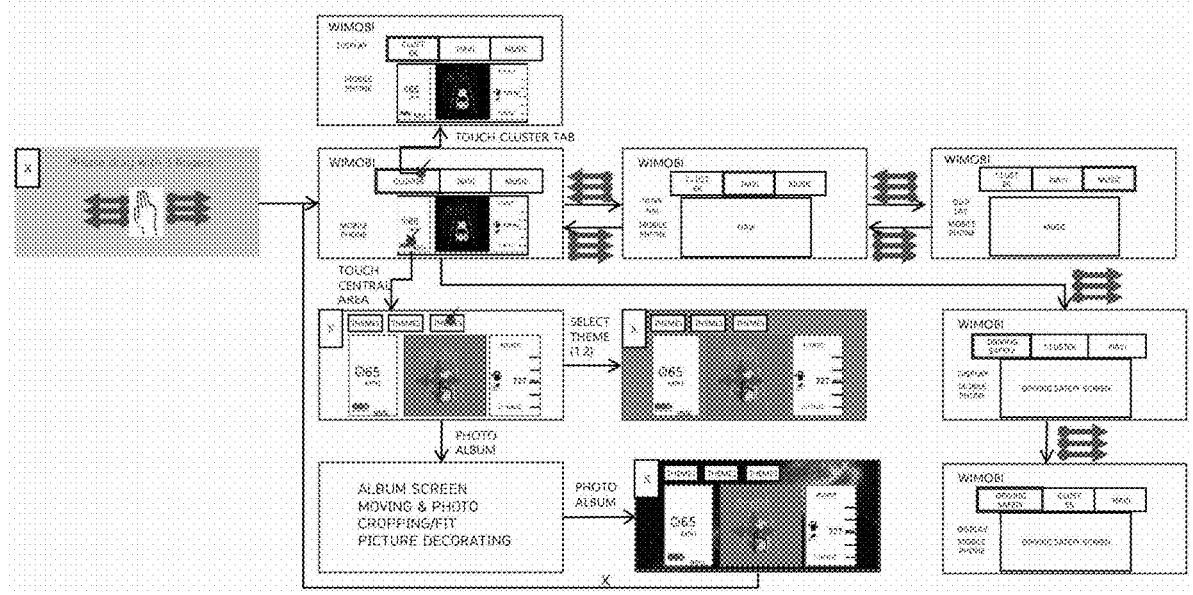

FIG. 6 illustrates an interior display setting process using a mobile phone app.

During the interior display setting process, the display of the interior display is set depending on the movement of the mobile phone. Since the cluster area is a basic area, other functions cannot be allocated to the basic area.

The interior display screen can be moved to the navigation screen, the media screen or the like through side-to-side drag. When the central area is touched, the background and theme of the cluster screen can be selected, and a driving safety screen can be set.

Figure 7:
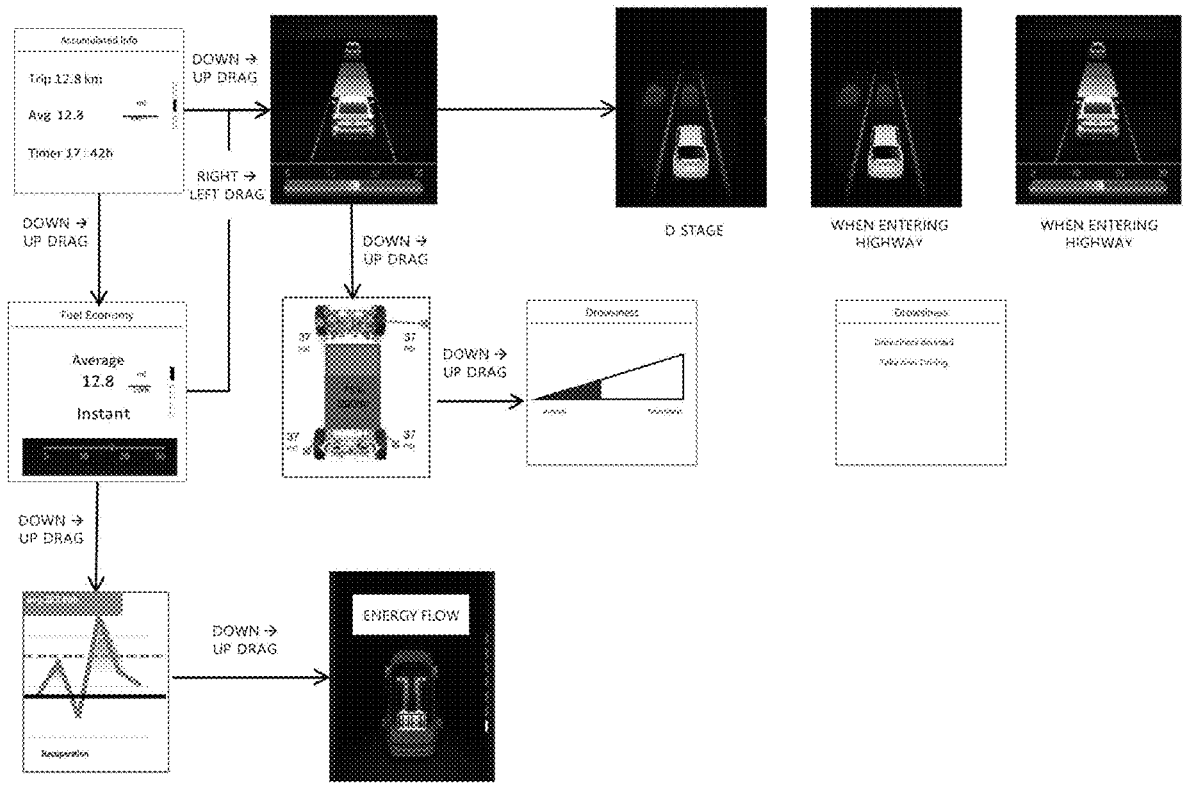

Referring to FIG. 7, the movement rule of the central area is set during the cluster setting process using a mobile phone app.

As the cluster is manipulated, the screen of the cluster area (central area) of the display is changed.

Through down-up drag on a trip screen, fuel information, power information and the like are displayed.

Through right-left drag on the trip screen, driving information is displayed on the cluster screen, and the screen is changed according to gear information, driving road information (e.g. highway).

Furthermore, the display of a warning message based on drowsiness detection is set.

Figure 8:
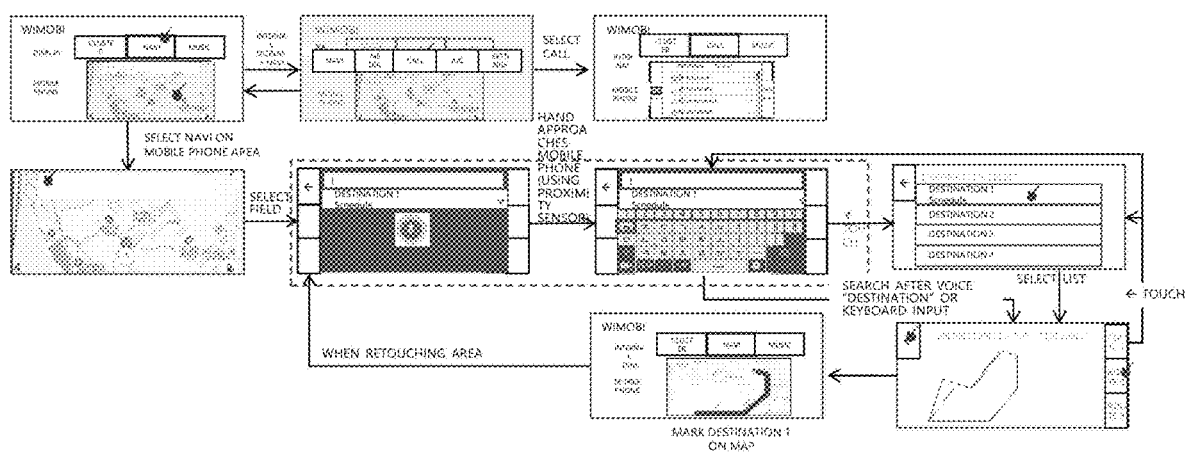

FIG. 8 illustrates a navigation setting process using a mobile phone app.

As an item of the interior display is selected, various tabs such as navigation, media, call, A/C and settings are displayed. When "Call" is selected, call history information, contact information and the like are displayed.

When the screen of the mobile phone is touched, a specific function can be set.

For example, destination information and route information of the navigation may be set, or contact information to which a user will make a call may be set.

When place/address search is clicked, a voice recognition screen is displayed. As the user's hand approaches the mobile phone, the voice recognition screen is changed to a text input screen.

When a destination is inputted through a voice or keyboard input and a route is inputted, pre-set destination/route information is displayed through the navigation screen after the user gets on the vehicle.

When the user pre-sets functions through the mobile phone app, places the mobile phone on a steering wheel after getting on the vehicle, and then turns on the ignition, the pre-set functions are sequentially executed. For example, when "Call" is set to a function which is preferentially executed, a call is made to a pre-set contact.

At this time, a calling time can be reserved. As the reserved calling time arrives during driving, a message is displayed to ask a driver if the driver wants to make a call to a pre-set contact. As the driver confirms the message, calling can be performed.

Furthermore, when it is expected that the vehicle will pass through a rough road or a noisy section such as a tunnel/construction section at the reserved calling time, a message which recommends the driver to make a call before/after the reserved calling time can be provided to the driver.

Figure 9:
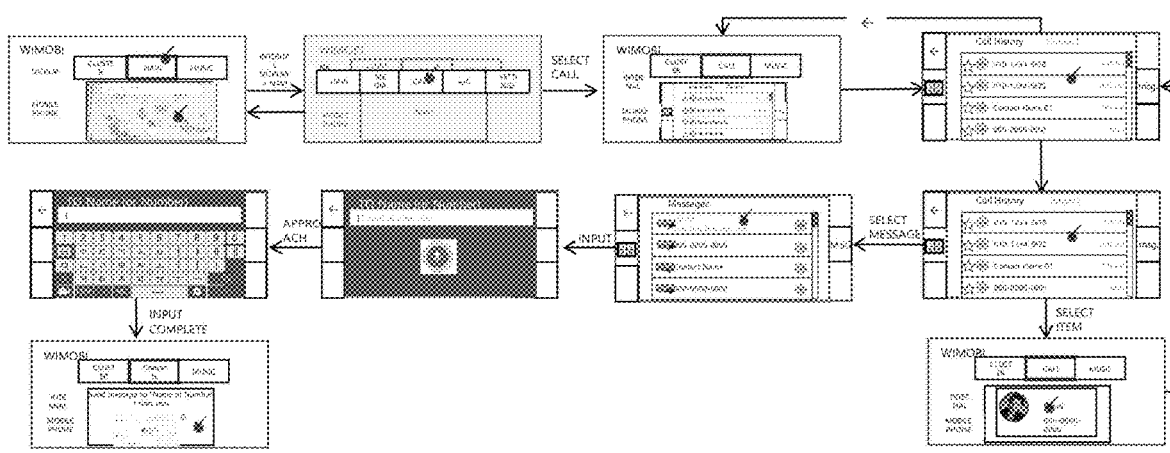

FIG. 9 illustrates a call function setting process using a mobile phone app.

As an item of the interior display is selected, various tabs such as navigation, media, call, A/C and settings are displayed. When "Call" is selected, call history information, contact information and the like are displayed.

For example, when a specific phone number corresponding to a recent call record and a message input are selected with reference to the call history information, a voice recognition screen is displayed, and a message to be transmitted is inputted through voice.

At this time, when the user's approach to the mobile phone is detected through a proximity sensor, a keyboard screen for text input, not the voice input screen, is displayed on the mobile phone.

When the message is completely inputted through the voice input or text input, a confirmation screen is displayed to ask the user to whom the message is to sent, in case that the vehicle starts driving after the ignition is turned on.

Figure 10:
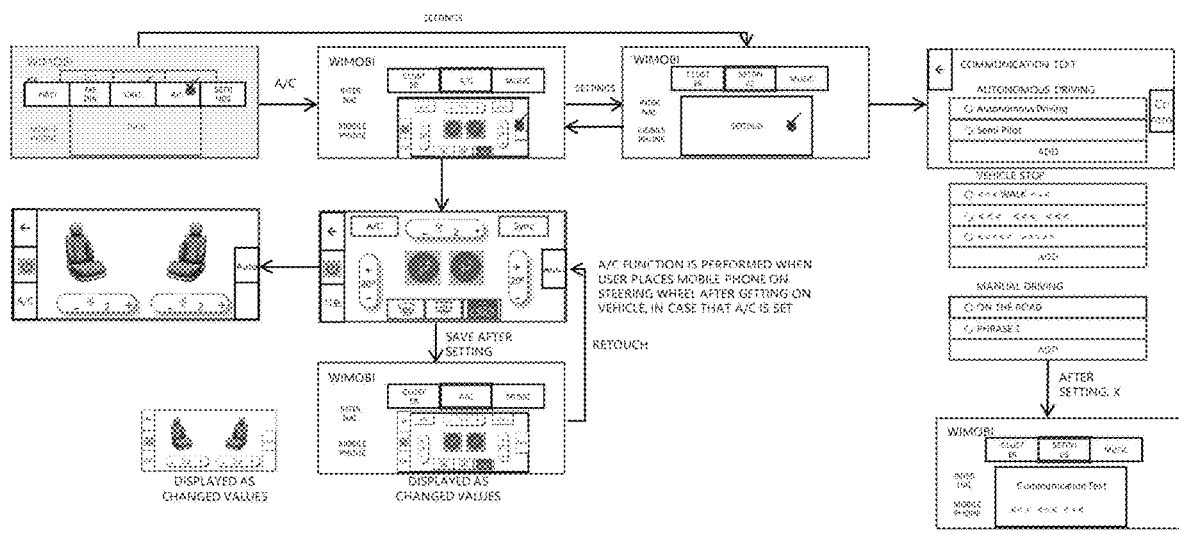

FIG. 10 illustrates a setting process using the mobile phone app.

As an item of the interior display is selected, various tabs such as navigation, media, call, A/C and settings are displayed. When "A/C" is selected, the settings of the A/C function, which will be executed after the user gets on the vehicle, are manipulated.

When the settings of the A/C function are manipulated and then completely stored, the pre-set A/C function is performed as the user places the mobile phone on the steering wheel after getting on the vehicle.

Furthermore, a communication text which is to be displayed through the exterior display is set. For example, a group of communication texts such as "Autonomous Driving", "Stop" and "Manual Driving", which are to be displayed according to a driving condition is displayed, and a communication text can be selected and set.

Figure 11:
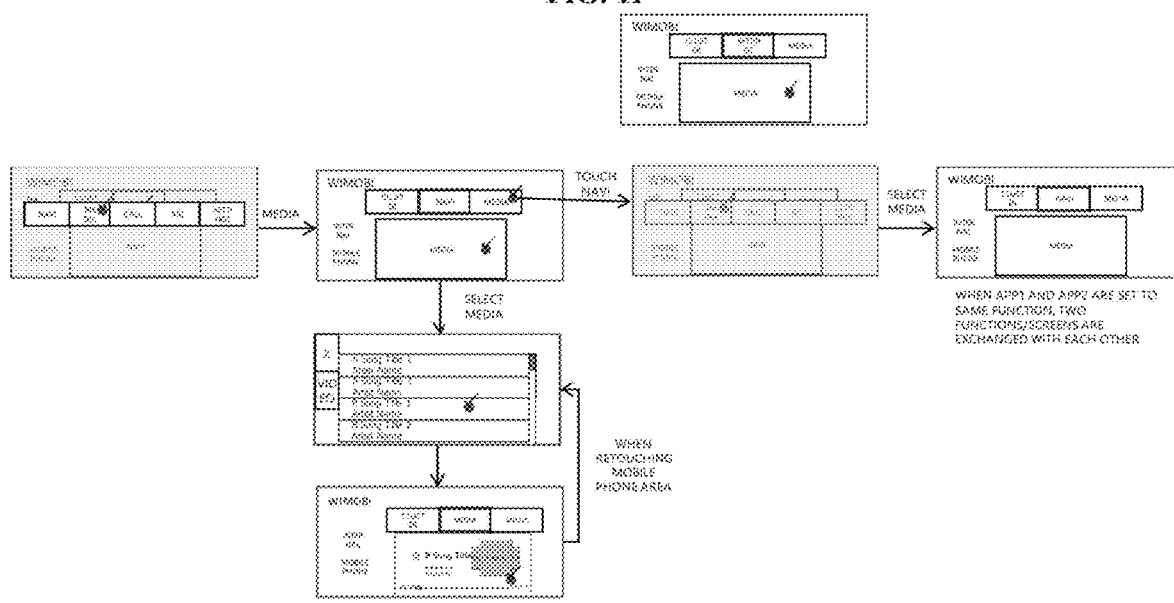

FIG. 11 illustrates a media setting process using the mobile phone app.

As an item of the interior display is selected, various tabs such as navigation, media, call, A/C and settings are displayed. When "Media" is selected, the settings of the media function, which will be executed after the user gets on the vehicle, are manipulated.

When a song is selected on the media screen, a play list is played from the corresponding song.

When the user places the mobile phone on the steering wheel after getting on the vehicle, the functions are performed according to the pre-set order. At this time, the media function is also performed according to the pre-set order.

For example, when the above-described calling function is set, the media function is executed to play a pre-set song, after a call is ended.

Figure 12:
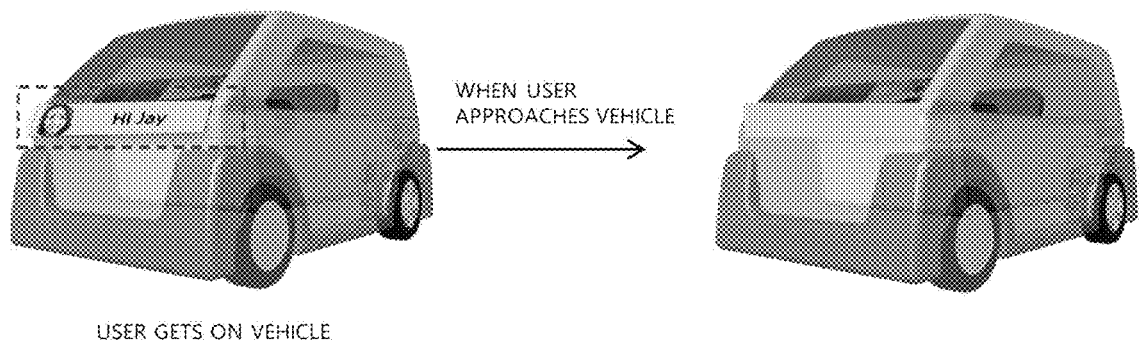

FIG. 12 illustrates a screen displayed through the exterior display when a driver approaches the vehicle.

The vehicle information display apparatus recognizes a user approaching the vehicle, and connects the user's mobile phone to the vehicle system, and the exterior display of the vehicle displays a welcome screen (e.g. a screen including picture/text information) which is pre-set through the mobile phone app.

When the user gets on the vehicle, the screen of the exterior display is turned off.

Figure 13:
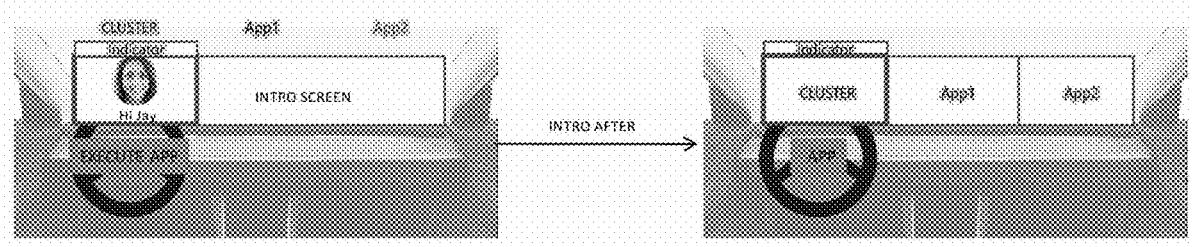

FIG. 13 illustrates the case in which the user places the mobile phone on the steering wheel after getting on the vehicle.

When the user places the mobile phone on the steering wheel after getting on the vehicle, user authentication is performed, and a screen designated through the mobile phone app in advance is displayed on the interior display.

The user authentication may be performed through key information, a separate password, or biological information such as fingerprint or iris.

As the user gets on the vehicle and places the mobile phone on the steering wheel, screens pre-set through the mobile phone app are displayed on the cluster area, the first area App1 and the second area App2.

When there is no screen set through the mobile phone app, a default screen is displayed.

For example, the initial screen of the navigation is displayed on the first area, and the initial screen of the media is displayed on the second area.

When a default focus is located at the cluster area, the movement between the areas is performed through a pre-set method (e.g. three-finger left/right drag, dragging with one finger is also possible). Such movement between the areas includes even the movement to a driving safety area.

Figure 14:
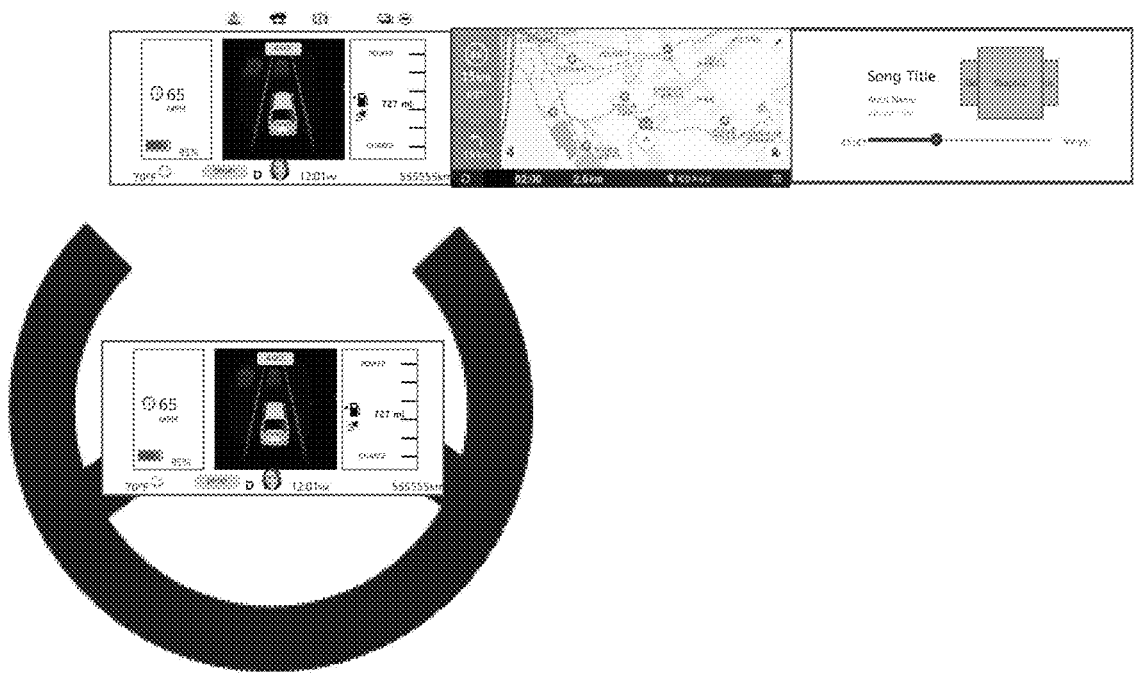

FIG. 14 illustrates the interior display after the user gets on the vehicle.

As the user gets on the vehicle and places the mobile phone on the steering wheel, the screens pre-set through the mobile phone app are displayed on the cluster area, the first area App1 and the second area App2. For example, the navigation screen is displayed on the first area, and the media screen is displayed on the second area.

The default focus is located at the cluster area, and the movement between areas is performed through a pre-set method (e.g. 3-finger left/right drag).

In relation to the focus, the focus is maintained for a pre-set time (e.g. 10 seconds) after the last manipulation.

When the pre-set time has elapsed, the focus is removed. On the interior display, the focus disappears, and information is displayed on each area.

Figure 15:
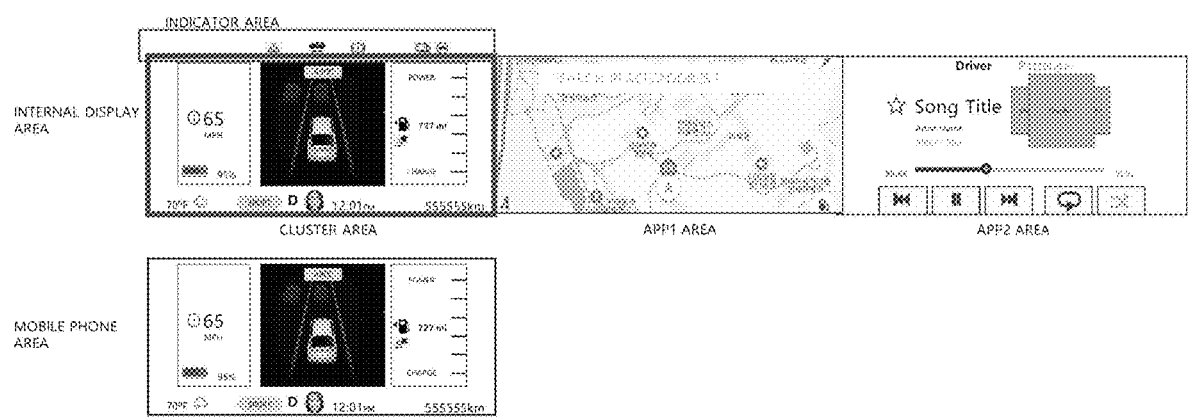

FIG. 15 illustrates the interior display and the mobile phone area.

An indicator area is not displayed on the mobile phone, but displayed at the top of the cluster area on the interior display.

When the steering wheel is moved from the driver seat to the passenger seat and a driving control right is transferred, the cluster area is moved to the location of the second area. At this time, the indicator area is displayed at the top of the moved cluster area.

Figure 16:
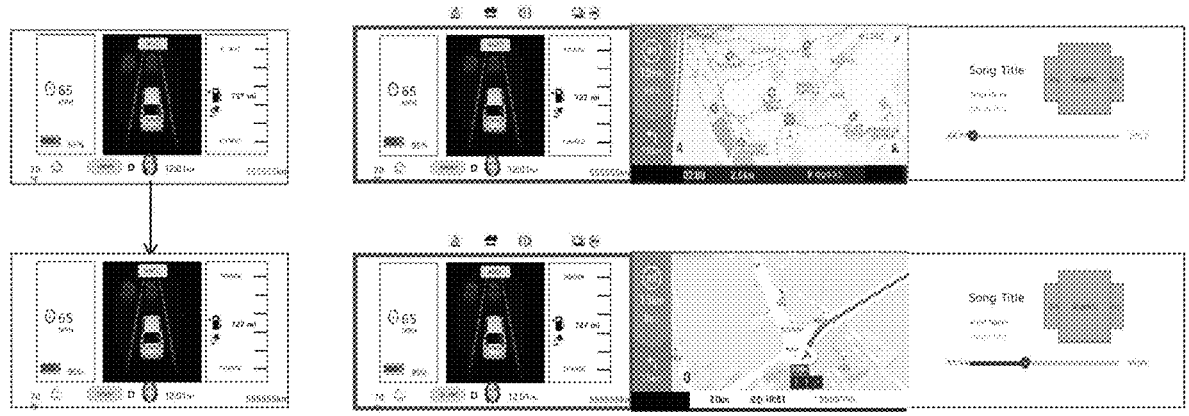

FIG. 16 illustrates that a function is executed after the pre-setting process is performed through the mobile phone app.

When a destination and route are pre-set through the mobile phone app in relation to the navigation, the information is reflected into the theme and the central screen of the cluster area. When the vehicle is started, the focus is located in the center of the screen according to the default focus.

The route guidance is started according to the pre-set destination/route, and pre-set music is automatically played in relation to the media.

Even when the navigation, A/C, media and settings (communication text) functions excluding the call function are not displayed on the interior display, the pre-set functions are performed.

Figure 17:
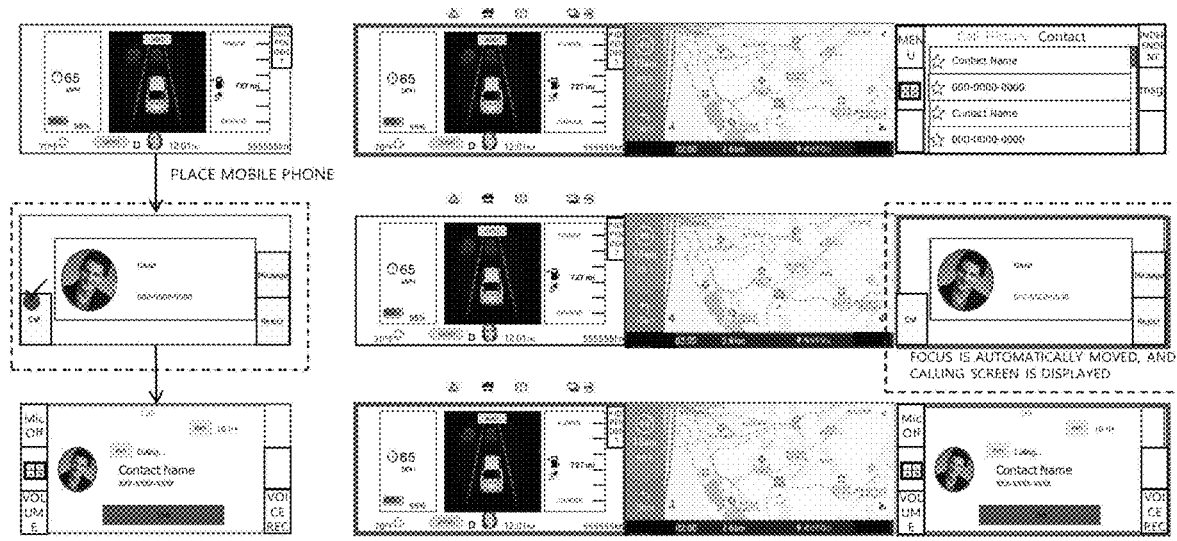

Referring to FIG. 17, when a function of making a call to a specific contact is set through the mobile phone, a calling function is performed as the user places the mobile phone on the steering wheel after gets on the vehicle.

At this time, when the call function is allocated to the first or second area, the call function is executed.

That is, when the call function is allocated to the second area, the focus is automatically moved, and the call screen is displayed.

When the call function is not allocated to the first or second area, the focus may be moved to the call function through a menu button, and the function pre-set through the mobile phone is executed.

Figure 18:
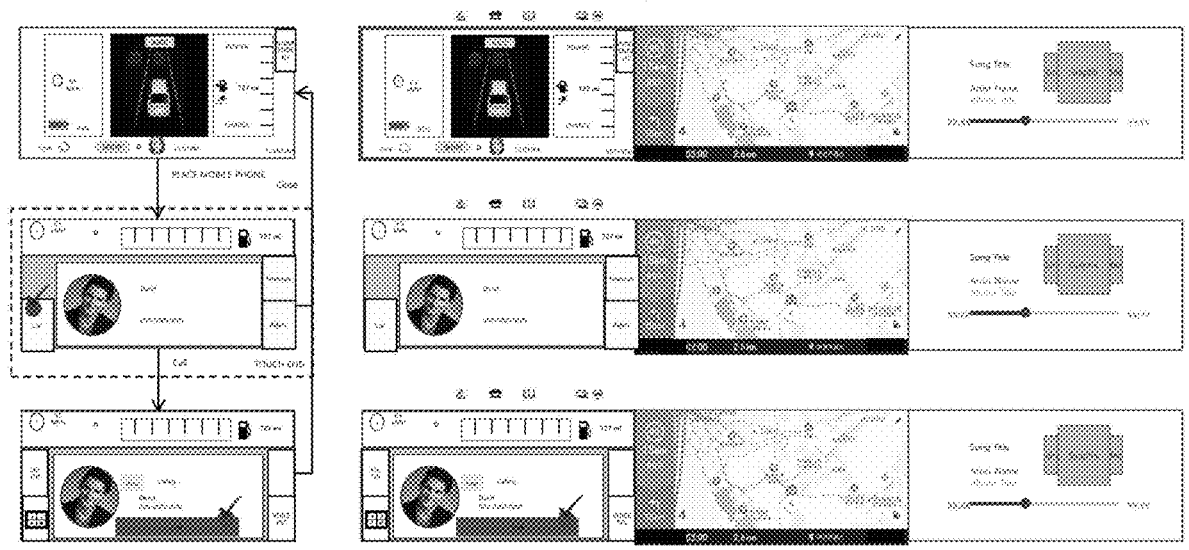

Referring to FIG. 18, when the call function is allocated to the first or second area as described above, the call function is executed. However, when the call function is not allocated to the first or second area, the focus may be moved to the corresponding function through the menu button, and the function pre-set through the mobile phone app is executed.

The vehicle information display method in accordance with the embodiment of the present disclosure may be implemented in a computer system or recorded into a recording medium. The computer system may include one or more processors, a memory, a user input device, a data communication bus, a user output device and a storage place. The above-described components perform data communication through the data communication bus.

The computer system may further include a network interface coupled to a network. The processor may be a CPU (Central Processing Unit) or a semiconductor device configured to process a command stored in the memory and/or storage place.

The memory and the storage place may include various types of volatile or nonvolatile storage media. Examples of the memory may include a ROM and RAM.

Therefore, the vehicle information display method in accordance with the embodiment of the present disclosure may be implemented as a method which can be executed in the computer. When the vehicle information display method in accordance with the embodiment of the present disclosure is executed in a computer device, computer readable commands may perform the vehicle information display method.

The vehicle information display method in accordance with the present disclosure may be implemented as computer readable codes in a computer readable recording medium. The computer readable recording medium includes all types of recording media capable of storing data which can be read by a computer system. Examples of the computer readable recording medium may include a ROM, RAM, magnetic tape, magnetic disk, flash memory, optical data storage device and the like. Furthermore, the computer readable recording medium may be stored and executed as codes which can be distributed in computer systems connected through a computer communication network, and read in a distributed manner.

While various embodiments have been described above, it will be understood to those skilled in the art that the embodiments described are by way of example only. Accordingly, the disclosure described herein should not be limited based on the described embodiments.

What is claimed is:

1. A display system for a vehicle, comprising:
an input unit configured to communicate with a user terminal;
a plurality of displays including an interior display;
a processor; and
a computer-readable medium in communication with the processor and storing instructions that, when executed by the processor, cause the processor to control the display system to perform:
receiving, from the user terminal via the input unit, pre-setting information before the vehicle starts moving, the pre-setting information including reserved communication information for a call or message reserved to be made or sent after the vehicle starts moving, the reserved communication information including (1) reserved call information including call receiver contact information and a calling time to make the reserved call or (2) reserved message information including message content and message recipient contact information of the reserved message;
after receiving the pre-setting information, detecting whether the vehicle has started moving; and
in response to detecting that the vehicle has started moving, performing:
controlling, based on the received pre-setting information, the interior display such that a display area of the interior display is divided into a plurality of screens respectively displaying different images; and
making the reserved call or sending the reserved message based on the reserved communication information.

2. A display system for a vehicle, comprising:
an input unit configured to communicate with a user terminal;
a plurality of displays including an interior display;
a processor; and
a computer-readable medium in communication with the processor and storing instructions that, when executed by the processor, cause the processor to control the display system to perform:
receiving, from the user terminal via the input unit, pre-setting information;
detecting whether the vehicle has started moving; and
in response to detecting that the vehicle has started moving, controlling, based on the received pre-setting information, the interior display such that a display area of the interior display is divided into a plurality of screens, each screen displaying a different image,
wherein the received pre-setting information includes (1) reserved call information including call receiver contact information and a calling time to make a call reserved to be made or (2) reserved message information including message content and message recipient contact information of a message reserved to be sent out,
wherein the instructions, when executed by the processor, further cause the processor to control the display system to perform making a call or sending a message based on the reserved call or message information, and
wherein, for making the call, the instructions, when executed by the processor, further cause the processor to control the display system to perform recommending a calling time based on driving condition information.

3. The display system of claim 1, wherein:
the plurality of displays further includes an exterior display,
the received pre-setting information further includes external communication text information, and
the instructions, when executed by the processor, further cause the processor to control the display system to perform controlling the exterior display to display the external communication text information based on a driving condition.

4. A method of operating a display system of a vehicle, the display system comprising a plurality of displays including an interior display, the method comprising:
receiving, from a user terminal, pre-setting information before the vehicle starts moving, the pre-setting information including reserved communication information for a call or message reserved to be made or sent after the vehicle starts moving, the reserved communication information including (1) reserved call information including call receiver contact information and a calling time to make the reserved call or (2) reserved message information including message content and message recipient contact information of the reserved message;
after receiving the pre-setting information, detecting whether the vehicle has started moving; and
in response to detecting that the vehicle has started moving, performing:
controlling, based on the received pre-setting information, the interior display such that a display area of the interior display is divided into a plurality of screens respectively displaying different images; and
making the reserved call or sending the reserved message based on the reserved communication information.

5. The method of claim 4, wherein:
the plurality of displays further includes an exterior display,
the received pre-setting information further includes external communication text information, and
the method further comprises, in response to detecting that the vehicle has started moving, performing:
- extracting the external communication text information and
- displaying, on the exterior display of the vehicle, the extracted external communication text information based on a driving condition.

* * * * *